Patented June 2, 1936

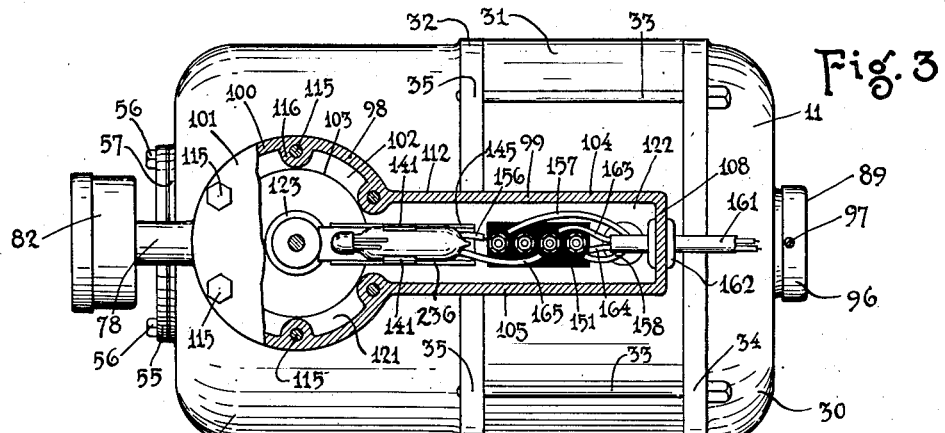

2,042,510

UNITED STATES PATENT OFFICE 2,042,510

MOTOR PUMP UNIT

Richard T. Cornelius and Nelson F. Cornelius, Jr., Minneapolis, Minn.

Application December 1, 1933, Serial No. 700,538

11 Claims. (Cl. 230—18)

Our invention relates to motor pump units and particularly to pumps for pumping air and has for its object to provide a motor pump unit which will operate efficiently and at a relatively high rate of speed.

Another object of the invention resides in providing a motor pump unit which will require practically no attention and in which the parts will not readily wear out.

A still further object of the invention resides in providing a motor pump unit in which the motor is automatically started and stopped when the pressure falls below or reaches predetermined pressure limits.

Another object of the invention resides in providing a device by means of which the load on the pump is reduced while the motor is starting.

An object of the invention resides in constructing the motor pump unit with a case carrying the pump and motor and having a single bearing for journalling the rotor of the motor.

Another object of the invention resides in disposing the operating mechanism for the pump within said case and in placing a lubricant within the case whereby all of the moving parts of the motor pump unit except the valves are lubricated.

A feature of the invention resides in attaching a housing to the case in which the motor is disposed.

A still further object of the invention resides in mounting a second case upon the first case and in installing the control mechanism for the motor within said second case.

An object of the invention resides in utilizing a pump of the diaphragm type and in employing a control diaphragm for controlling the operation of the motor.

A feature of the invention resides in arranging said diaphragms concentrically and in spaced relation.

An object of the invention resides in disposing a block between said diaphragms and in mounting the valves of the pump within said block.

Another object of the invention resides in connecting the inlet for the pump to the motor housing whereby the air pumped by the pump is drawn from the motor housing thus cooling the motor and muffling the noise of the pump.

A still further object of the invention resides in utilizing a restricted orifice between the control diaphragm and pump, whereby the pulsations of the pump are damped so as to prevent irregular control of the motor.

A feature of the invention resides in constructing the block with a pump chamber disposed in proximity to the pump diaphragm and with a pressure chamber disposed in proximity to the control diaphragm.

An object of the invention resides in constructing the block with two bores, one of said bores communicating with both of said chambers and the other of said bores communicating with the pump chamber.

Another object of the invention resides in providing inlet and outlet passageways, said outlet passageway communicating with the first named bore and the inlet passageway with the second named bore.

A still further object of the invention resides in installing inlet and outlet valves within said bores between the inlet and outlet passageways and the pump chamber.

An object of the invention resides in employing a light spring for normally holding the inlet valve open, said spring having sufficient resiliency to maintain the valve open at low motor speeds and functioning to permit the valve to close at high motor speeds.

A feature of the invention resides in arranging the inlet passageway in proximity to said housing and in providing a conduit extending between said inlet passageway and said housing.

An object of the invention resides in constructing the second named case with a portion overhanging the housing and in providing conductors extending between the overhanging portion of the second named case and housing for controlling the operation of the motor.

Other objects of the invention reside in the novel combination and arrangement of parts and in the details of construction hereinafter illustrated and/or described.

In the drawings:

Fig. 3 is a plan sectional view taken on line 3—3 of Fig. 1.

Figs. 4 and 5 are fragmentary elevational longitudinal sectional views of the valve mechanism, and associated parts of the motor pump unit, said views being similar to Fig. 1 and drawn to a larger scale and showing the parts in altered position.

Figure 1:
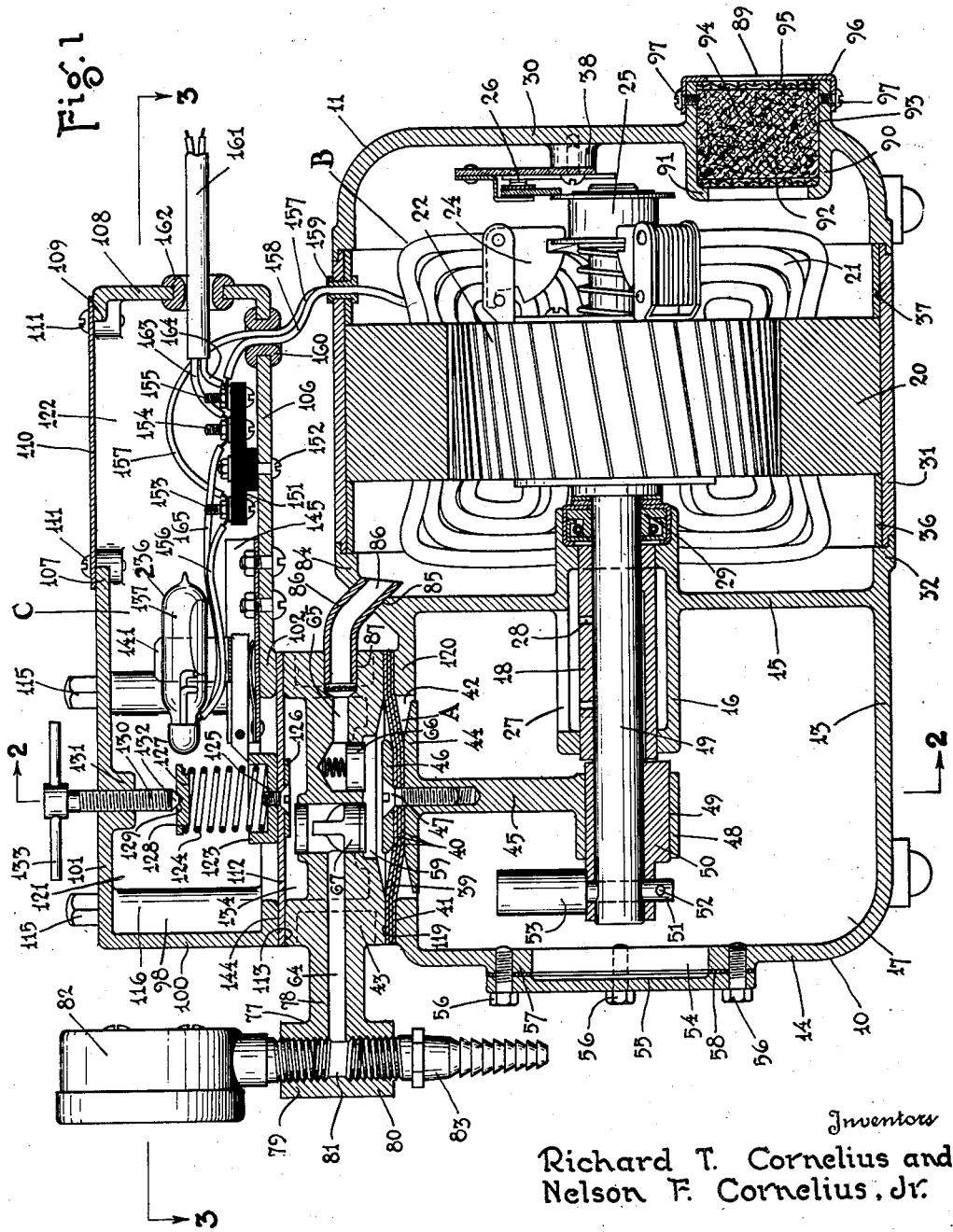
Fig. 1 is a longitudinal elevational sectional view of a motor pump unit illustrating an embodiment of our invention.

Our invention comprises a pump which we have indicated in its entirety by the reference character A, a motor B for operating the same and control mechanism C for actuating and stopping the motor B when the pressure reaches defined upper and lower limits. These various parts will now be described in detail.

For the purpose of supporting the housing for the various parts, a case 10 is employed adjoining which is a housing 11. The case 10 contains a quantity of oil and has disposed within it all of the moving parts of the pump unit excepting the valves, said moving parts being thoroughly lubricated through the splashing of the oil within said case. The housing 11 contains the motor B while a case 12 situated above the case 10 and supported thereby, contains the control mechanism C.

The case 10 is cylindrical in form, being constructed with a circumferential wall 13 and with two end walls 14 and 15 which are circular in form. By means of this construction a chamber 17 is formed within the case 10 which contains the oil referred to and which is not shown, and by means of which the operating parts of the motor pump unit may be lubricated. For the purpose of gaining access to the chamber 17, an opening 54 in the end wall 14 of case 10 is provided, which opening is closed through a cap 55. This cap is secured to the said wall by means of a number of cap screws 56 which pass through the cap and are threaded into a rim 57 formed on the wall 14 adjacent opening 54. A gasket 58 may be employed to form a tight connection between the cap 55 and the case proper. The wall 15 is provided near its center with a boss 16 which extends inwardly into the case 10. This boss is bored to receive a bearing 18 which journals the shaft 19 of the motor rotor which will be presently described in detail. The pump A is disposed above the case 10 and is operated from the shaft 19 by a construction which will be presently also described in detail.

The specific construction of the motor B forms no particular feature of the invention, though we find that a split phase alternating current single phase motor may be advantageously used. Such a motor is illustrated in Fig. 1. This motor consists of a field core 20 which is provided with the usual field windings 21. A squirrel cage armature 22 is rotatable within the field core 20 and is rigidly secured to the shaft 19. The shaft 19 carries at one end a centrifugal governor 24 which is adapted to slide a collar 25 along the said shaft 19. Collar 25 operates a cut-out switch 26 by means of which the starting windings of the motor are cut out of the circuit when the motor gains sufficient speed. The shaft 19 is journaled in the single bearing 18 which is disposed within the chamber 17 of case 10. By means of the suitable passageways 27 formed in the boss 16, oil which is splashed around in the chamber 17 is directed to the bearing 18 where the same passes through oil holes 28 to the contacting surfaces of the bearing and the shaft. A stuffing box 29 of any suitable design may be employed which encircles shaft 19 and is secured to case 10 and which serves to prevent the oil from running out of the end of the bearing 18 and into the housing 11.

The motor B is contained within the housing 11 as previously recited. This housing consists of an end bell 30 and a sleeve 31 connected thereto. The sleeve 31 is also fitted to a flange 32 formed on the end wall 15 of case 10. This construction serves as a bell for the other end of the housing 11. The bell 30 is bolted to the case 10 through bolts 33 (Fig. 3) which bolts extend through lugs 34 formed on the end bell 30 and threaded into other lugs 35 formed on the flange 32. The core 20 is received within the sleeve 31 and is held in spaced relation therein through rings 36 and 37 which fit snugly within said sleeve and are seated against the core 20 and the respective parts of the case 10 and the end bell 30. The end bell 30 is provided with suitable bosses 38 upon which the switch 26 is mounted.

The pump A is of the diaphragm type and comprises a diaphragm 39 constructed of a number of plies 40 of some suitable flexible material, such as certain types of fabric. For attaching the diaphragm to case 10 the same is constructed at the upper portion of the wall 13 with a circular opening 42. This portion of the case is provided with a seat 41 encircling the opening 42. Above the seat 41 is a block 43 which is also provided with a seat indicated at 119 and facing seat 41. The diaphragm 39 is clamped between these seats as will be presently more fully described.

The diaphragm of pump A has secured to it a circular head 44 which is attached to the end of a connecting rod 45. A washer 46 is mounted upon the other side of the diaphragm 39 and is secured to the said diaphragm through a countersunk machine screw 47 which is threaded into the connecting rod 45. The connecting rod 45 is constructed with a boss 48 at the end thereof opposite the head 44, which boss is drilled at 49 to form a bearing for an eccentric 50. The eccentric 50 is mounted upon the extreme end of the shaft 19 projecting into chamber 17 of housing 10 and is attached to said shaft through a pin 51 which passes through said eccentric and shaft. The pin 51 is held in position through a cotter key 52 as shown. It will readily become apparent that as the shaft 19 is rotated, connecting rod 45 is reciprocated and the diaphragm 39 correspondingly reciprocated. To prevent undue vibration, the pin 51 is constructed with an enlarged elongated head 53 which serves as a counter-weight for the eccentric 50. This head 53 dips into the oil in case 10 and further serves as a splasher for effecting the proper oiling of the bearing 18.

Adjacent the diaphragm 39 of pump A and within the block 43 is formed a pump chamber 59. This pump chamber is best shown in Figs. 4 and 5 and is constructed with a relatively flat conical portion 60 and a cylindrical portion 61 communicating therewith. The shape of the chamber 59 is such that when the diaphragm 39 is reciprocated as shown in Fig. 5, the said chamber is almost completely closed, whereby air is almost entirely expelled from the chamber. The cylindrical portion 61 is of such dimensions as to receive the washer 46, while the conical portion 60 of said chamber receives the upwardly flexed portion of the diaphragm 39.

The block 43 is constructed with two vertical bores 62 and 63, both of which bores communicate with chamber 59. The block 43 is further constructed with an outlet passageway 64 and an inlet passageway 65 which communicate with the respective bores 62 and 63. An inlet valve 66 is disposed in the bore 63 between the inlet passageway 65 and the chamber 59. Likewise an outlet valve 67 is employed which is disposed in the bore 62 between the passageway 64 and chamber 59. The inlet valve 66 consists of a cage 68 which is formed with a valve seat 69. A flapper valve 70 seats against the seat 69 and is held in said cage through a retainer 71. A compression coil spring 72 is seated at one end against the portion of the block 43 defining the end of the bore 63 and at its other end against the flapper 70. This spring normally holds the valve open so that when the diaphragm 39 is traveling slowly, the air is readily expelled through the opening in the marginal edges of the flapper valve and no pressure is built up. When, however, the speed of the motor increases sufficiently to throw the motor starting winding out, the pressure created in the chamber 59 builds up enough to close the valve 66, thereby causing the device to operate in the usual manner. The valve 67 is constructed of rubber being formed with a rubber nipple 73 which is mounted on a stud 74. Stud 74 is pressed into the bore 62 and is constructed with a bead 75 which holds the said nipple in place. The end of the nipple is split as designated at 76 to provide an opening through which the air may escape. This opening is normally closed and prevents the reverse flow of air through the valve.

For the purpose of directing the air to the place of use, the block 43 is constructed with a T 77 cast integral therewith. This T is provided with a branch 78 through which the passageway 64 extends and is further provided with branches 79 and 80 extending upwardly and downwardly from the branch 78. A passageway 81 extends through these branches and communicates with the passageway 64. In the branch 79 is screwed a gauge 82 by means of which the pressure in the system may be determined. A hose connector 83 is screwed in the branch 80. This connector and said gauge 82 both communicate with the passageway 81 and are subject to the full pressure created by the pump.

Figure 2:
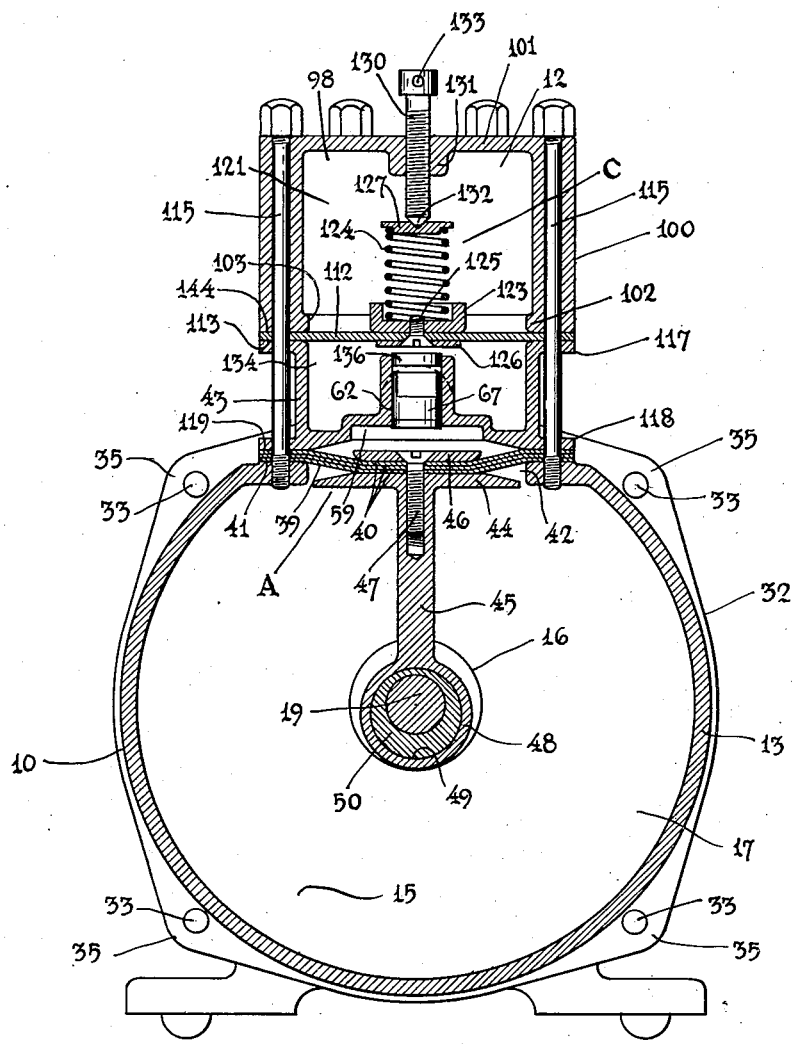
Fig. 2 is a transverse sectional view taken on line 2—2 of Fig. 1.

As previously stated, the air entering the pump is drawn through the housing 11 of motor B. This is for the purpose of muffling the noise created by the pump as well as for the purpose of cooling the motor. It will be noted in Figs. 1 and 2 that the seat 41 on case 10 is considerably below the sleeve 31 which provides a wall 84 at the upper end of the housing 11 disposed above the case 10. This wall is drilled as indicated at 85 to receive a tube 86 which is also inserted into an enlargement 87 of the passageway 65. A screen 88 at the end of this enlargement serves to filter the air entering the pump and prevents the clogging of the two valves 67 and 68.

The housing 11 is normally closed except for an air inlet 89 best shown in Fig. 1. This inlet consists of a tube 90 open at its ends and provided at its inner end with an inwardly turned flange 91. A screen 92 extends across said tube and is seated against the inner edge of said flange. Within the tube 90 is disposed some suitable air filtering material such as cotton waste, mineral wool, felt, or similar substance which is designated by the reference character 94. A screen 95 covers the outer surface of the filter 94 and prevents the same from being accidentally displaced. This screen is held in place through a flanged ring 96 which encircles the cylindrical wall 90 and is attached thereto through screws 97. It will readily be comprehended that air may be drawn into the housing 11 through the filtering material 94 and thus cleaned and filtered before being introduced into the system. Thereafter, the air is carried through the pump and directed to the source of use.

Our invention is intended to maintain a constant pressure and for this purpose the control apparatus C is employed. This apparatus is contained within the case 12 which consists of a casting being formed with a circular portion 98 and an elongated portion 99 connected therewith. The circular portion 98 consists of a cylindrical wall 100 formed with a circular top 101 and a circular bottom 102. The bottom 102 has a circular opening 103 in the center thereof, the purpose of which will be presently described. The elongated portion 99 of case 12 consists of two longitudinally extending walls 104 and 105 connected to the circular wall 100. These walls have connected to them a bottom 106 and a top 107 which lie in continuation of the top 101 and the bottom 102 of the circular portion 100. An end wall 108 connects the various walls 104, 105 and 106 together. The wall 107 is constructed with an opening 109 through which access to the interior of the case may be had. This opening is closed by a cover 110 secured to the top 107 through machine screws 111. By means of this construction the case 12 is formed with a circular compartment 121 defined by the walls 98, 101 and 102 and a compartment 122 defined by the walls 103, 104, 106, 107 and 108.

The control device proper includes a diaphragm 112 which rests on a seat 113 formed on the upper portion of the block 43. This diaphragm is clamped upon said seat by means of the bottom 102 of the circular portion 100 of case 12 which is formed with a similar seat 144 resting upon said diaphragm. A number of cap screws 115 extend through bosses 116 formed in the interior of the case 12 and through flanges 117 and 118 on the block 43 by means of which the two seats 113 and 119 are formed. These cap screws screw into the portion 120 of case 10 in which the seat 41 is formed. By means of this construction the two cases and block are securely clamped together and the two diaphragms 112 and 39 held rigidly in position.

The upper surface of the diaphragm 112 has secured to it a cup 123 which forms a seat for a compression coil spring 124. Cup 123 is threaded to receive a counter-sunk machine screw 125 which passes through a washer 126 placed upon the underside of the said diaphragm. By means of the said screw the washer and cup are securely clamped to opposite sides of the diaphragm and the spring 124 held centered with respect to said diaphragm. The other end of the spring 124 is seated against a cap 127 which is formed with a recess 128 to receive the end of said spring and which is further constructed with a conical socket 129 at its upper end. An adjusting screw 130 is threaded into a boss 131 in the top 101 of case 12 and is formed with a conical point 132 fitting into the socket 129. This screw is further constructed with a handle 133 by means of which the same may be rotated. By means of the screw 130 the pressure on the spring 124 can be regulated to cause the device to maintain any desired air pressure as will be presently more fully described.

In the block 43 is formed a pressure chamber 134 which is disposed adjacent the underside of the diaphragm 112. Bore 62 communicates with this chamber through a constricted orifice 135 formed in a disk 136 which is secured in the end of said bore. By means of this orifice the air compressed within the passageway 64 is also directed into chamber 134 and the diaphragm 112 moved in opposition to the spring 124. By utilizing an orifice such as indicated, pulsations of the pump are damped whereby irregular operation of the control device is prevented.

The control device C includes a switch mechanism 236, best shown in Figs. 1, 3 and 5. This switch mechanism comprises a glass tube 137 which contains a quantity of mercury 138. At the end of the tube 137 are provided two contacts 139 and 140 which are adapted to be connected together by the mercury 138 when the tube is tilted in the proper manner. The two contacts 139 and 140 are connected in the motor circuit as will be presently described. The tube 137 is mounted between two spring clips 141 formed by bending up the ends of a strip of sheet metal 142. The strip 142 is soldered to a bar 143, which bar is pivoted at one end through a pin 144 to a supporting structure 145. Supporting structure 145 consists of a channel shaped member having upstanding legs 146 and a base portion 147. This supporting structure is attached to the bottom 106 of the case 12 through bolts 150 and extends toward the center of the diaphragm 112. The bar 143 fits in between the two legs 146 and the pin 144 passes jointly through said legs and said bar. A leaf spring 148 is secured to the base 147 of the support 145 and engages the underside of the bar 143 normally urging the said bar upwardly and causing the said tube 137 to tilt so that the mercury closes the circuit through the two contacts 139 and 140.

The bar 143 is constructed at its outer end with a finger 149 which is adapted to engage the upper edge of the cup 123. When the diaphragm 112 is raised through the pressure in chamber 134, cup 123 forces the finger 149 upwardly and tilts the tube 137 so that the mercury flows away from the contacts 139 and 140 and breaks the circuit through the same. When diaphragm 112 moves in the opposite direction the spring 148 tilts tube 137 in the opposite direction and the mercury connects the contacts together.

For the purpose of controlling the operation of the motor through the switch mechanism 236 the following construction is used. In the chamber 122 of case 12 is disposed a binding post block 151 which is constructed of some suitable insulating material such as fiber or one of the various phenol formaldehyde products. This block is attached to the bottom 106 of case 12 through a bolt 152. The block 151 is provided with three binding posts 153, 154 and 155. A conductor 156 is connected to the binding post 153 and to one of the contacts 139 or 140 of tube 137. The other of these two contacts is connected through a conductor 165 with binding post 154. Another conductor 157 is connected to the binding post 153 and goes to the motor B. A corresponding conductor 158 also connected to said motor is connected to the binding post 155. For the purpose of leading these two conductors to the motor the sleeve 31 and spacer ring 37 are provided with a bushing 159 through which said conductors extend. A similar bushing 160 in the bottom 106 of case 12 leads these conductors into the chamber 122 thereof. Current is conducted to the device through a cable 161 which passes through a bushing 162 in the end wall 108 of case 12. The two conductors 163 and 164 of this cable are connected to the two binding posts 154 and 155.

The operation of our invention is as follows: When the pressure within the chamber 134 is below normal, diaphragm 112 is moved downwardly through spring 124 which allows the leaf spring 148 of switch mechanism 236 to swing the bar 143 upwardly and to tilt the tube 137 in a manner to cause the mercury 138 to close the circuit through the contacts 139 and 140. When this occurs, a circuit may be traced as follows: Commencing with conductor 163 of cable 161, current flows through conductor 165, the two contacts 139 and 140, conductor 156, conductor 157 to the motor, back again from the motor through conductor 158, and from there to the conductor 164 of cable 161. The motor B is now energized and the same commences to rotate. In normal operation, the switch 26 is cut in and the starting winding is in the circuit. The particular windings forming no feature of the invention have not been shown, but it can readily be comprehended when the motor reaches speed, the governor 24 throws the starting switch out and the motor runs as a single phase induction motor. During the starting of the motor the spring 72 holds the flapper valve 70 open. While the valve is so held air may leak past the opening in the marginal portion thereof and but a very slight pressure is built up in the chamber 59. As, however, the motor speed increased the resistance to the travel of the air through these passageways is greatly increased and the pressure within the chamber 59 built up. When the pressure is sufficient, the flapper valve 70 is caused to travel and to seat against the seat 69, which causes the valve to close and the pressure within the chamber 59 builds up rapidly. As soon as this occurs, the pump functions in the normal manner drawing air through the inlet passageway 65 and discharging the same through the outlet passageway 64. Valve 67 during such operation functions in the intended manner, releasing the air through the slit 76 which immediately closes when the diaphragm 39 travels away from the valves 67 and 68. As the pressure builds up in the passageway 64 the air passes through the orifice 135 and into chamber 134. This causes the diaphragm 112 to be raised and the cup 123 which is attached to it to travel upwardly therewith. After the cup 123 has traveled a certain distance, the finger 149 of bearing 143 is elevated and the tube 137 tilted so that the mercury 138 runs away from the two contacts 139 and 140. This opens the circuit through the motor stopping the same. The positions of the various parts of the control mechanism are shown in Figs. 4 and 5. In Fig. 4 the pump diaphragm 39 is shown in its lowermost position while the control diaphragm has been illustrated as raised to a position sufficient to open the switch mechanism 236. In Fig. 5 the diaphragm 39 is shown in its uppermost position, while the diaphragm 112 is in its lowermost position in which case the tube 137 is sufficiently tilted to cause the mercury 138 to close the circuit through the contacts 139 and 140. In the operation of the device any desired pressure may be maintained in the passageway 64 through the agency of the adjusting screw 130. The said screw is merely turned until the gauge 82 indicates the desired pressure.

Our invention is highly advantageous in that a simple and practical device is provided which is practically fool proof. The pump having no sliding parts will not need attention or repair until the diaphragm used therewith has been worn out. Likewise the diaphragm 112 will operate continually until worn out. By employing a single bearing for the motor and in arranging the same within the oil case of the invention, all of the moving parts are simultaneously lubricated from the same lubricating source. Through the action of the oil seal or stuffing box, oil is prevented from leaking to the motor which is maintained perfectly dry. For this reason injury to the motor through oil is entirely prevented and the motor caused to operate without interruption. By drawing the air through the motor housing, the noise from the pump is muffled and the motor at the same time cooled. By means of the arrangement of parts an extremely efficient, neat and compact device is provided of minimum weight. It will be noted that the various conduits for the air are arranged so that the same are as short as possible. The invention is extremely simple and is positive in action. Through the use of the counter balance an extremely smooth running compressor unit is provided which can be placed in any desired location and used for any desired purpose. Although our compressor may be used for various purposes, it is particularly adaptable for use as a beer pump for pumping air into beer kegs whereby the beer may be drawn from the same.

Changes in the specific form of our invention, as herein disclosed, may be made within the scope of what is claimed without departing from the spirit of our invention.

Having described our invention, what we claim as new and desire to protect by Letters Patent is:

1. In a motor pump unit, a motor, a pump including a diaphragm, means for operating said diaphragm from said motor, a switch mechanism for controlling said motor, a diaphragm responsive to the pressure created by said pump for operating said switch mechanism, said diaphragms being concentrically disposed, and means for jointly clamping both of said diaphragms in position.

2. In a motor pump unit, a motor, a pump including a diaphragm, means for operating said diaphragm from said motor, a switch mechanism for controlling said motor, a diaphragm responsive to the pressure created by said pump for operating said switch mechanism, said diaphragms being concentrically disposed, a block between said diaphragms, the valve mechanism of said pump being carried by said block, said block forming chambers adjacent each of said diaphragms, said chambers being in communication through said valve mechanism.

3. In a motor pump unit, a motor, a pump including a diaphragm, means for operating said diaphragm from said motor, a switch mechanism for controlling said motor, a diaphragm responsive to the pressure created by said pump for operating said switch mechanism, said diaphragms being concentrically disposed, a block between said diaphragms, said block being formed with a pump chamber adjacent the pump diaphragm, a pressure chamber adjacent said control diaphragm, and a discharge passageway, an inlet valve controlling the flow of fluid to said pump chamber, an outlet valve controlling the flow of fluid from the pump chamber to the pressure chamber and said discharge passageway.

4. In a motor pump unit, a case, a pump carried by said case, said pump including a diaphragm, a housing adjoining said case, a motor disposed within said housing, means forming a drive between said motor and pump, switch mechanism for controlling said motor, a control diaphragm, means operated by said control diaphragm for actuating said switch mechanism, said control diaphragm being arranged in spaced overlying relation with respect to said pump diaphragm, a block between said diaphragms, said block being formed with a pump chamber adjacent the pump diaphragm, and a pressure chamber adjacent the control diaphragm, said block being further formed with two bores extending between said diaphragms, one of said bores communicating with the pump chamber, the other of said bores communicating with both of said chambers, valves in each of said bores for controlling the flow of fluid into and out of the pump, said block being formed with an outlet passageway communicating with the bore connected to both chambers and with an inlet passageway communicating with the other bore.

5. In a motor pump unit, a case, a pump carried by said case and disposed at the upper portion thereof, a housing adjoining said case, a motor disposed within said housing, means within said case forming a drive between said motor and pump, a second case situated above said first case and connected to the same at the locality of said pump, said second case overlying said housing, control apparatus contained within said second case, said control apparatus including electrical conductors extending through the overlying portion of said second case and through said housing to the motor.

6. In a motor pump unit, a case, a pump carried by said case, said pump including a diaphragm, a housing adjoining said case, a motor disposed within said housing, means forming a drive between said motor and pump, switch mechanism for controlling said motor, a control diaphragm, means operated by said control diaphragm for actuating said switch mechanism, said control diaphragm being arranged in spaced overlying relation with respect to said pump diaphragm, a block between said diaphragms, said block being formed with a pump chamber adjacent the pump diaphragm, and a pressure chamber adjacent the control diaphragm, said block being further formed with two bores extending between said diaphragms, one of said bores communicating with both of said chambers and the other bore communicating with said pump chamber, valves in each of said bores for controlling the flow of fluid into and out of the pump, said block being formed with an outlet passageway communicating with the bore connected to both chambers and with an inlet passageway communicating with the other bore, said inlet passageway being in proximity to said housing, and a conduit extending between said inlet passageway and said housing.

7. In a motor pump unit, a case, a pump carried by said case and disposed at the upper portion thereof, a housing adjoining said case, a motor disposed within said housing, said pump comprising a diaphragm seated against said case, means within said case operated by said motor for reciprocating said diaphragm, a block overlying said diaphragm, a second diaphragm mounted on said block, a second case overlying said second diaphragm, means for securing said cases, diaphragms and block together, control means contained within said second case, said second case having a portion overhanging said housing and conductors extending through the overhanging portion of said case and through said housing for actuating said motor from said control mechanism.

8. In a motor pump unit, a case, a pump carried by said case and disposed at the upper portion thereof, a housing adjoining said case, a motor disposed within said housing, said pump comprising a diaphragm seated against said case, means within said case operated by said motor for reciprocating said diaphragm, a block overlying said diaphragm, a second diaphragm mounted on said block, a second case overlying said second diaphragm, means for securing said cases, diaphragms and block together, and control means for controlling the operation of the motor and contained within said second case.

9. In a motor pump unit, a pump case having an oil chamber therein, a housing connected with the case, an electric motor within the housing, a bearing within the case, a shaft medially journaled in said bearing, one end of said shaft constituting the motor shaft and the other end thereof constituting the pump shaft, the pump including an eccentric on said shaft and a connecting rod connected with said eccentric, and a diametrally disposed pin for securing said eccentric to said shaft and for counterbalancing the same, said pin further serving as a splasher for supplying oil to said eccentric and to said bearing from the oil chamber in said case.

10. In a motor pump unit, a reciprocating pump for pumping a gas, means forming a pumping chamber and an inlet and an outlet communicating therewith, inlet and outlet valves in said inlet and outlet, one of said valves including a reciprocable valve member adapted to move through the flow of the gas past the same, a motor capable of being started from rest and having a minimum running speed, means forming a permanent drive between said motor and pump and a spring acting on said valve member and urging said valve member into opening position, said spring being sufficiently stiff to hold said valve open at speeds of said motor below the minimum running speed, said valve member being of suitable dimensions to cause the same to move into closing position through the action of the current of gas flowing past the same, at speeds of said motor above the minimum running speed.

11. In a motor pump unit, a reciprocating pump for pumping a gas, means forming a pumping chamber and an inlet and an outlet communicating therewith, inlet and outlet valves in said inlet and outlet, one of said valves including a reciprocable valve member of relatively light weight adapted to move through the flow of the gas past the same, a motor capable of being started from rest and having a minimum running speed, means forming a permanent drive between said motor and pump and a spring acting on said valve member and urging said valve member into opening position, said spring being sufficiently stiff to hold said valve open at speeds of said motor below the minimum running speed, said valve member having sufficient area to cause the same to move into closing position through the action of the current of gas flowing past the same at speeds of said motor above the minimum running speed.

RICHARD T. CORNELIUS.
NELSON F. CORNELIUS, Jr.